United States Patent
Inoue

(10) Patent No.: US 7,488,777 B2
(45) Date of Patent: Feb. 10, 2009

(54) RESIN COMPOSITION AND FILM OBTAINED THEREFROM

(75) Inventor: Norihide Inoue, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 465 days.

(21) Appl. No.: 11/209,749

(22) Filed: Aug. 24, 2005

(65) Prior Publication Data

US 2006/0047073 A1 Mar. 2, 2006

(30) Foreign Application Priority Data

Aug. 25, 2004 (JP) .............................. 2004-245915

(51) Int. Cl.
C08L 23/00 (2006.01)
C08L 23/04 (2006.01)
(52) U.S. Cl. ...................... 525/191; 525/240
(58) Field of Classification Search ................. 525/191, 525/240
See application file for complete search history.

(56) References Cited

U.S. PATENT DOCUMENTS

| | | | |
|---|---|---|---|
| 6,214,447 B1 * | 4/2001 | Nakagawa et al. | 428/215 |
| 6,444,302 B1 * | 9/2002 | Srinivas et al. | 428/315.5 |
| 6,503,637 B1 | 1/2003 | Van Loon | |
| 6,747,114 B2 * | 6/2004 | Karandinos et al. | 526/348.2 |
| 6,855,406 B2 * | 2/2005 | Takayasu et al. | 428/220 |
| 6,984,696 B2 * | 1/2006 | Curry et al. | 525/191 |

FOREIGN PATENT DOCUMENTS

| | | |
|---|---|---|
| EP | 0 437 632 A1 | 7/1991 |
| EP | 0 870 794 A1 | 10/1998 |
| EP | 0 936 247 A1 | 8/1999 |
| EP | 1 118 638 A1 | 7/2001 |
| EP | 1 344 797 A1 | 9/2003 |
| JP | 3-66737 A | 3/1991 |
| JP | 9-137013 A | 5/1997 |
| JP | 11-049903 A | 2/1999 |
| JP | 11-228758 A | 8/1999 |
| JP | 11-342568 A | 12/1999 |
| JP | 2001-131365 A | 5/2001 |
| JP | 2002-240210 A | 8/2002 |
| TW | 490476 B | 6/2002 |
| WO | WO 98/59001 A1 | 12/1998 |

OTHER PUBLICATIONS

English language abstract of Taiwanese Patent Application No. I225504, Dec. 21, 2004, Fukatani.

* cited by examiner

*Primary Examiner*—Nathan M Nutter
(74) *Attorney, Agent, or Firm*—Buchanan Ingersoll & Rooney PC

(57) ABSTRACT

A resin composition containing 1 to 50% by weight of a propylene-based copolymer (a) which has a melting point (Tm (a)) as measured by a differential scanning calorimeter (DSC) of 100° C. or lower, or has no melting point, and 50 to 99% by weight of a polymer (b), and a film obtained therefrom are provided, and preferably the initial elastic modulus of the film measured according to JISK6781 is 300 MPa or less. The film has excellent transparency, heat sealing property and tear resistance.

24 Claims, No Drawings

RESIN COMPOSITION AND FILM OBTAINED THEREFROM

BACKGROUND OF THE INVENTION

1. Field of the Invention

The present invention relates to a resin composition, and a film obtained therefrom. In particular, the invention relates to a resin composition suitable for a film which has good transparency and heat sealing property and also excellent flexibility and tear resistance, and a film obtained therefrom. The film of the invention can be suitably used as a film for packaging.

2. Description of the Related Art

A stretch film that is used in domestic use or business use for preservation of food or the like is prepared from polyvinyl chloride or polyvinylidene chloride. However, films made of these polymers contain a large quantity of chlorine atoms in the raw material resin, and therefore they have potential for causing generation of dioxin, depending on the methods of disposal and incineration. Thus, development of a composition for wrapping film which does not contain a chlorine atom is in progress.

As the polyolefin-based stretch film which does not contain the chlorine atom, conventionally there are known monolayer or multilayer films having a film made from a composition comprising low density polyethylene and various resins as at least one layer, and monolayer or multilayer films having a film made from a composition comprising polypropylene and various resins as at least one layer. The film made of low density polyethylene is inferior in transparency, whereas the film made of polypropylene has good transparency and strong stiffness, while having a problem of low impact strength.

It is described in JP-A No. 11-228758 that a stretch film with excellent transparency is obtained from a resin composition comprising an ethylene/α-olefin copolymer obtained by using a metallocene catalyst, and low density polyethylene obtained by high pressure radical polymerization. However, when the resin composition according to the publication is formed into a film by, for example, inflation molding, etc., the film has poor transparency and poor heat sealing property and tear resistance, thus imposing limitation in the materials to be packaged (See JP-A No. 11-2287588).

In addition, JP-A Nos. 3-66737 and 9-137013 describe strippable protective films obtained from a composition comprising an ethylene/α-olefin copolymer, a propylene/butene-1 copolymer, and optionally a tackifier. The film obtained from a composition as described in JP-A No. 3-66737 or JP-A No. 9-137013 has excellent tackiness and can be effectively used as, for example, a strippable protective film intended to protect a substrate by being adhered thereto. However, the above-mentioned film may have poor tear strength and impact strength, and thus it can be said only with difficulty that this film is necessarily suitable for the use as packaging film as used in packaging, transporting and storing a content material, as it is the case for a stretch film for example. Further, JP-A No. 3-66737 does not describe on transparency of the film. In JP-A No. 9-137013, although there is mention on transparency, a composition which is well balanced between transparency and tear strength is not described.

SUMMARY OF THE INVENTION

An object of the present invention is to provide a resin composition which results in a film well balanced between transparency, heat sealing property and tear resistance, and a film obtained therefrom.

The present inventors have found that the above-described problems can be solved by a film obtained from a composition comprising a certain propylene/α-olefin copolymer and an ethylene-based polymer, and have completed the invention.

Thus, the resin composition of the present invention comprises 1 to 50% by weight of a propylene/$C_{2\ and\ 4\text{-}20}$ α-olefin copolymer (a) which has a melting point as measured by a differential scanning calorimeter (DSC) of 100° C. or lower, or has no melting point, and 50 to 99% by weight of a polymer (b) selected from the group consisting of ethylene homopolymers and ethylene/α-olefin copolymers.

Further, the film of the present invention is formed from the aforementioned resin composition, and preferably the film has an initial elastic modulus as measured according to JISK6781 of 300 MPa or less.

DESCRIPTION OF THE PREFERRED EMBODIMENTS

The invention relates to a resin composition which comprises a propylene/α-olefin copolymer having a specific melting point or no melting point and an ethylene-based polymer, and further to a film obtained therefrom which has a specific elastic modulus.

Resin Composition

The resin composition of the invention comprises:

1 to 50% by weight, preferably 1 to 40% by weight, more preferably 1 to 30% by weight, even more preferably 1 to 29% by weight, and particularly preferably 3 to 29% by weight, of a propylene/$C_{2\text{-}20}$ α-olefin (provided that propylene is excluded) copolymer (a) which has no melting point or has a melting point as measured by DSC (the endothermic peak observed when the polymer is maintained at 200° C. for 5 minutes, followed by cooling to −20° C. at a cooling rate of −20° C./min and heating again to 180° C. at a heating rate of 20° C./min), Tm (a), of 100° C. or lower, preferably in the range of 40 to 95° C., and more preferably in the range of 50 to 90° C.; and 50 to 99% by weight, preferably 60 to 99% by weight, more preferably 70 to 99% by weight, even more preferably 71 to 99% by weight, and particularly preferably 71 to 97% by weight, of a polymer (b) selected from the group consisting of ethylene homopolymers and ethylene/α-olefin copolymers, where copolymer (a) and polymer (b) are summed to a total of 100 % by weight.

When the propylene/α-olefin copolymer has no melting point or a melting point of 100° C. or lower, a resin composition which is well balanced between tear strength and heat sealing property can be obtained.

The propylene/$C_{2\text{-}20}$ α-olefin (provided that propylene is excluded) copolymer (a) can be obtained by copolymerizing propylene and an α-olefin (provided that propylene is excluded) having 2 to 20 carbon atoms using a known olefin polymerization catalyst, while particularly a copolymer obtained using a metallocene catalyst is preferred because it results in a film with less tackiness. In this case, the molecular weight distribution (Mw/Mn) of the copolymer as obtained by gel permeation chromatography (GPC) is preferably 3.0 or less, and more preferably in the range of 1.0 to 3.0. The conditions for GPC measurement are such that the value is determined in ortho-dichlorobenzene at 140° C. in terms of polystyrene. For example, the measurement can be made by using Model GPC-150C manufactured by Waters Corp. as the apparatus, and using TSKgel GNH6-HT and TSKgel GNH6-HTL as the separating columns.

As the α-olefin having 2 to 20 carbon atoms which is copolymerized with propylene, mention may be made of at least one α-olefin having 2 to 20 carbon atoms (except propylene), including ethylene, 1-butene and 1-pentene, preferably an α-olefin having 4 to 20 carbon atoms, and more preferably an α-olefin having 4 to 10 carbon atoms. In this case, transparency of the resulting copolymer is excellent.

Preferably, the α-olefin is 1-butene or a mixture containing 1-butene as the main component. A preferred copolymer (a) is a propylene/$C_{4-20}$ α-olefin copolymer, more preferably a propylene/$C_{4-10}$ α-olefin copolymer, and particularly preferably a propylene/1-butene copolymer.

Such propylene/α-olefin copolymer can be obtained by using a catalyst such as one as described in, for example, WO95/14717, but it is particularly preferred to use the catalyst described in WO2004/087775. For such propylene copolymer, preferably used is one having the melting point Tm (a) (° C.), and the content of the comonomer constituent as determined from the measurement of $^{13}C$-NMR spectrum, M (mol %), in a relationship in the following range of:

$$146 \exp(-0.022M) \geq Tm(a) \geq 125 \exp(-0.032M)$$

wherein M is the content (mol %) of the α-olefin having 2 to 20 carbon atoms (provided that propylene is excluded), when propylene and the α-olefin having 2 to 20 carbon atoms (provided that propylene is excluded) are summed to a total of 100 mol %. In the present invention, the content (mol %) of the α-olefin having 2 to 20 carbon atoms (provided that propylene is excluded) in the copolymer (a), when propylene and the α-olefin having 2 to 20 carbon atoms (provided that propylene is excluded) are summed to a total of 100 mol %, is preferably 5 to 50 mol %, more preferably 15 to 30 mol %.

The melt flow rate of the propylene/$C_{2-20}$ α-olefin (provided that propylene is excluded) copolymer (a), as measured according to ASTM D-1238 at 230° C. under a load of 2.16 kg (hereinafter, abbreviated to MFR (230° C.)), is in the range of 1 to 40 (g/10 min), and preferably in the range of 3 to 20 (g/10 min).

The polymer (b) is an ethylene homopolymer or a copolymer of ethylene and at least one α-olefin having 3 to 20 carbon atoms (ethylene/α-olefin copolymer). Its molecular structure may be linear, or branched with a long or short side chain. Especially preferably, it is an ethylene/α-olefin copolymer obtained by copolymerizing ethylene and an (α-olefin having 3 to 20 carbon atoms in the presence of a metallocene catalyst.

Specific examples of the α-olefin having 3 to 20 carbon atoms which is used as the comonomer of such ethylene/α-olefin copolymer include propylene, 1-butene, 1-pentene, 1-hexene, 4-methylpentene-1,1-octene, 1-decene, 1-dodecene and mixtures thereof, and among these, propylene, 1-butene, 1-hexene and 1-octene are preferred. Further, the copolymer may optionally contain a small amount of another comonomer, for example, dienes such as 1,6-hexadiene and 1,8-octadiene, cyclic olefins such as cyclopentene, and the like.

The density (ASTM D1505, 23° C.) of the polymer (b) is usually from 0.890 to 0.960 g/cm$^3$, preferably from 0.890 to 0.930 g/cm$^3$, more preferably from 0.895 to 0.930 g/cm$^3$, even more preferably from 0.895 to 0.928 g/cm$^3$, and still more preferably from 0.895 to 0.925 g/cm$^3$. With the density in these ranges, a film which is well balanced particularly between heat resistance, tear strength and transparency is obtained.

In this case, the polymer (b) according to the invention, especially the ethylene/α-olefin copolymer, preferably has a molecular weight distribution (Mw/Mn) as obtained by gel permeation chromatography (GPC) of 3.0 or less, and more preferably in the range of 1.5 to 3.0. Further, the conditions for GPC measurement are such that the value is determined in ortho-dichlorobenzene at 140° C. in terms of polystyrene. For example, the measurement can be made by using Model GPC-150C manufactured by Waters Corp. as the apparatus, and using TSKgel GNH6-HT and TSKgel GNH6-HTL as the separating columns.

Such ethylene/α-olefin copolymer has excellent heat sealing property when compared with an ethylene/α-olefin copolymer having the same density. The reason for this is not certain, but it is contemplated that such phenomenon is due to a lower melting point with respect to the density. An ethylene/α-olefin copolymer showing a molecular weight distribution (Mw/Mn) as described above can be prepared by using, for example, a metallocene catalyst.

Furthermore, the polymer (b) according to the invention is such that the temperature (Tm (b) (° C.)) at the maximum peak position in the endothermic curve measured by a differential scanning calorimeter (DSC), and the density (d (g/cm$^3$)) together satisfy a relationship represented by Tm (b)<400×d−248, preferably Tm (b)<450×d−296, and more preferably Tm (b)<500×d−343. Such a polymer can be said to have a narrow composition distribution. Tm (b) is measured by DSC in the following manner. Specifically, about 5 mg of a sample is placed in an aluminum pan, and Tm (b) is determined from an endothermic curve obtained by heating the sample to 200° C. at a rate of 10° C./min, maintaining at 200° C. for 5 minutes, cooling to room temperature at a rate of 20° C./min, and heating again at a rate of 10° C./min. As an endothermic curve, the one obtained in the second heating is adopted.

In the present invention, the content (mol %) of the α-olefin having 3 to 20 carbon atoms in the copolymer (b) is not particularly limited, but generally 0 to 20 mol %, preferably 0.5 to 15 mol %, more preferably 1 to 10 mol %, when ethylene and the α-olefin having 3 to 20 carbon atoms are summed to a total of 100 mol %.

The resin composition of the invention comprising the above-described propylene/$C_{2-20}$ α-olefin (provided that propylene is excluded) copolymer (a) and polymer (b) may contain, as long as the effect of the invention is not impaired, additives such as an antioxidant, a heat resistant stabilizer, a weather resistant stabilizer, a slipping agent, an antiblocking agent and a crystal nucleating agent, or other polyolefin resins such as a polypropylene resin, if needed.

Furthermore, it is possible to blend the respective aforementioned components and various additives as may be needed by means of a mixing machine such as, for example, a Henschel mixer, a Banbury mixer and a tumbler mixer, and then to use the blend in a pellet form in the film-forming process to be described later using a single screw or twin screw extruder, and it is also possible to supply the above-mentioned components in the blended state into a film-forming machine.

Film

The above-described resin composition of the invention can be formed into the film of the invention by using a T-die molding machine, an extrusion lamination molding machine or an inflation molding machine that is used in conventional polyolefin film forming processes. When the resin composition of the invention as described above is used, a film having excellent flexibility, transparency, heat sealing property and tear resistance is obtained.

The thickness of the film is preferably in the range of 1 to 500 μm, and more preferably in the range of 3 to 300 μm.

The initial elastic modulus as measured at a tensile rate of 200 m/min according to JISK6781, of the film of the invention is 300 MPa or less, preferably 250 MPa or less, and more preferably in the range of 10 to 200 MPa.

In addition, when the composition of the invention is molded into a film having a thickness of 50 μm, the haze of the film as measured according to ASTM D1003 is 5% or less, preferably 4% or less and more preferably 3% or less.

The film of the invention may be uniaxially or biaxially drawn. It may be also used in forming a laminate with films made of other resins or with a metal foil, and the film of the invention may be used in at least one layer therein. In the case of using as a laminate, the film made of other resins may be exemplified by those films obtained from polypropylene, polyethylene, polyamide and polyester, drawn films thereof, or metallizing films in which aluminum or a silicon compound is deposited onto the foregoing films. When such complex laminated structure is to be taken, known techniques such as a co-extrusion and an extrusion lamination can be preferably used, but the technique is not limited to these. It is also possible to use the film of the invention as a metallizing film in which aluminum or a silicon compound is directly deposited onto the film of the invention or a drawn film thereof.

In the process of preparing a laminate, for example, a laminated film, obtained by using the composition of the invention, it is possible to prepare the object by using a multilayer T-die molding machine or an inflation molding machine used in conventional polyolefin film forming processes.

The laminate, for example, the multilayer film, can be drawn by at least 1.5 times or more in one direction, thus being also made into a drawn film. The drawn film has excellent heat shrinkage and thus can be suitably used as a film for shrink packaging or as a shrink label. For the method for drawing, a known method for preparing a polyolefin drawn film can be used. Specifically, mention may be made of roll drawing, tenter drawing, tubular drawing or the like. The draw ratio is usually from 1.5 to 20 times, and preferably from 2 to 15 times.

The film of the invention can be used in applications where flexibility is desired such as, for example, a melt bag for packaging of rubber. Also, since the film is excellent in flexibility, transparency, gas permeability, heat sealing property, and the like, it can be suitably used as a film for packaging food such as vegetables, goodies or bread, or fabrics, and since the film is excellent in stretchability, it can be suitably used as a film for stretch packaging.

The film of the invention may have a tackifier or surfactant added in order to control tackiness or anti-fogging property. Examples of the tackifier include liquid hydrocarbons such as polybutene and olefin oligomers, liquid paraffin, aliphatic petroleum resins, alicyclic petroleum resins and the like. Examples of the surfactant include monoglycerin fatty acid esters, glycerin fatty acid esters, sorbitan fatty acid esters and the like. These may be used alone or in a mixture of two or more thereof.

The composition of the invention is, when molded into a film for example, particularly well balanced between tear strength and transparency.

EXAMPLE

Next, the invention will be explained by way of Examples, but the invention is not limited to these.

[Evaluation Methods]

$MFR_{190}$: Measurement was made according to ASTM D1238 at 190° C. under a load of 2.16 kg.

$MFR_{230}$: Measurement was made according to ASTM D1238 at 230° C. under a load of 2.16 kg.

Density: Measurement was made according to ASTM D1505.

Haze: Measurement was made according to ASTM D1003.

Elemendorf tear strength: Measurement was made according to JIS P8116.

Heat sealing property: Seal layers of films were attached to each other face to face, and heat sealing was carried out at a predetermined temperature under the conditions of a pressure of 0.2 MPa and a sealing time of 1.0 second. Thereafter, a specimen cut into a 15-mm rectangle was subjected to peeling between the layers in a 180° direction at a rate of 300 mm/min, and the peel strength was measured, with the strength value being taken as the heat seal strength (N/15 mm).

Example 1

A resin composition comprising 90% by weight of an ethylene/1-hexene copolymer obtained by using a metallocene catalyst, which the copolymer has a density of 0.905 g/cm$^3$, an $MFR_{190}$ value of 3.6 g/10 min, and a temperature at the maximum peak position in the endothermic curve measured by a differential scanning calorimeter (DSC) (melting temperature/Tm (b)) of 98° C., and a 1-hexene content of 7.6 mol %, and 10% by weight of a propylene/1-butene copolymer obtained by using a metallocene catalyst, which the copolymer has an $MFR_{230}$ value of 7.0 g/10 min, a melting temperature (Tm (a)) of 75° C., and a 1-butene content of 26 mol %, was used to obtain a monolayer film having a thickness of 50 μm with a T-die molding machine equipped with an extruder of 50 mmϕ and having a die width of 300 mm.

Properties of the resulting film are presented in Table 1.

Examples 2, 3 and Comparative Examples 1, 2, 3

Films were obtained in the same manner as in Example 1, except that the resin compositions conformed to the compositions described in Table 1. Properties of the resulting films are presented in Table 1.

TABLE 1

|  | Ex. 1 | Ex. 2 | Ex. 3 | Comp. Ex. 1 | Comp. Ex. 2 | Comp. Ex. 3 |
| --- | --- | --- | --- | --- | --- | --- |
| Resin Composition |  |  |  |  |  |  |
| m-PBR-1 (wt %) | 10 | 10 | 25 | — | — | — |
| m-PBR-2 (wt %) | — | — | — | 25 | — | — |
| m-LLDPE-1 (wt %) | 90 | — | — | — | 100 | — |
| m-LLDPE-2 (wt %) | — | 90 | 75 | 75 | — | 100 |
| Haze (%) | 1.0 | 1.5 | 1.9 | 3.3 | 1.1 | 2.2 |

TABLE 1-continued

|  | Ex. 1 | Ex. 2 | Ex. 3 | Comp. Ex. 1 | Comp. Ex. 2 | Comp. Ex. 3 |
|---|---|---|---|---|---|---|
| Elmendorf Tear Strength | | | | | | |
| MD/TD (N) | 5.2/10.1 | 6.4/10.1 | 9.0/18.0 | 4.0/7.1 | 3.5/6.6 | 5.6/7.6 |
| Tensile Test (MD/TD) | | | | | | |
| Strength at break point (MPa) | 46/48 | 49/51 | 53/55 | 53/54 | 43/47 | 46/49 |
| Elongation (%) | 450/700 | 550/700 | 550/700 | 500/600 | 500/600 | 480/590 |
| Initial elastic modulus (MPa) | 100/110 | 150/160 | 190/200 | 220/240 | 100/120 | 150/160 |
| Heat seal strength (N/15 mm) | | | | | | |
| 80° C. | 2.49 | 3.12 | 2.51 | 1.25 | 2.35 | 0.87 |
| 90° C. | 5.81 | 5.70 | 3.95 | 2.60 | 5.01 | 1.55 |
| 100° C. | 7.66 | 7.10 | 6.85 | 5.84 | 7.09 | 4.69 |
| 110° C. | 8.66 | 9.24 | 8.40 | 6.94 | 8.02 | 6.10 |
| 120° C. | 9.22 | 9.78 | 9.01 | 7.56 | 8.36 | 7.22 | m-LLDPE-1: Ethylene/1-hexene copolymer, 1-hexene content: 7.6 mol %, Density: 0.905 g/cm$^3$, MFR$_{190}$: 3.6 g/10 min, Tm: 98° C., Mw/Mn=2.1 m-LLDPE-2: Ethylene/1-hexene copolymer, 1-hexene content: 5 mol %, Density: 0.913 g/cm$^3$, MFR$_{190}$: 3.6 g/10 min, Tm: 113° C., Mw/Mn=2.1 m-PBR-1: Propylene/1-butene copolymer, 1-Butene content: 26 mol %, Melting point: 75° C., MFR$_{230}$: 7.0 10 g/10 min, Mw/Mn=2.1 m-PBR-2: Propylene/1-butene copolymer, 1-Butene content: 15 mol %, Melting 2-point 110° C., MFR$_{230}$ 7.0 g/10 min, Mw/Mn=2.1

Propylene/1-butene copolymer prepared with a metallocene catalyst

The film obtained from the resin composition of the invention is well balanced between tear strength and transparency, is further excellent in heat sealing property, and is suitable as a film for food packaging such as a stretch film. Thus, the film has very high industrial applicability.

What is claimed is:

1. A resin composition comprising 1 to 40% by weight of a propylene/C$_{4-20}$ α-olefin copolymer (a) which has a melting point (Tm (a)) as measured by a differential scanning calorimeter (DSC) of 100° C. or lower, or has no melting point, and 60 to 99% by weight of a polymer (b) selected from the group consisting of ethylene homopolymers and ethylene α-olefin copolymers.

2. The resin composition according to claim 1, wherein the polymer (b) has a density of 0.895 g/cm$^3$ to 0.960 g/cm$^3$.

3. The resin composition according to claim 2, which comprises 1 to 29% by weight of the propylene/C$_{4-20}$ α-olefin copolymer (a), and 71 to 99% by weight of the polymer (b).

4. The resin composition according to claim 2, wherein the propylene/C$_{4-20}$ α-olefin copolymer (a) has a molecular weight distribution (Mw/Mn) as measured by GPC of 3.0 or less.

5. The resin composition according to claim 2, wherein the polymer (b) has a molecular weight distribution (Mw/Mn) as measured by GPC of the polymer (b) of 3.0 or less.

6. A film formed from the resin composition according to claim 5.

7. The film according to claim 6, which has an initial elastic modulus measured according to JISK6781 of 300 MPa or less.

8. The resin composition according to claim 1, which comprises 1 to 29% by weight of the propylene/C$_{4-20}$α-olefin copolymer (a), and 71 to 99% by weight of the polymer (b).

9. The resin composition according to claim 1, wherein propylene/C$_{4-20}$ α-olefin copolymer (a) has a molecular weight distribution (Mw/Mn) as measured by GPC of 3.0 or less.

10. The resin composition according to claim 1, wherein the polymer (b) has a molecular weight distribution (Mw/Mn) as measured by GPC of the polymer (b) of 3.0 or less.

11. A film formed from the resin composition according to claim 4.

12. The film according to claim 11, which has an initial elastic modulus measured according to JISK6781 of 300 MPa or less.

13. A film formed from the resin composition according to claim 3.

14. The film according to claim 13, which has an initial elastic modulus measured according to JISK6781 of 300 MPa or less.

15. A film formed from the resin composition according to claim 2.

16. The film according to claim 15, which has an initial elastic modulus measured according to JISK6781 of 300 MPa or less.

17. A film formed from the resin composition according to claim 1.

18. The film according to claim 17, which has an initial elastic modulus measured according to JISKG781 of 300 MPa or less.

19. A film formed from the resin composition according to claim 8.

20. The film according to claim 19, which has an initial elastic modulus measured according to JISK6781 of 300 MPa or less.

21. A film formed from the resin composition according to claim 9.

22. The film according to claim 21, which has an initial elastic modulus measured according to JISK6781 of 300 MPa or less.

23. A film formed from the resin composition according to claim 10.

24. The film according to claim 23, which has an initial elastic modulus measured according to JISK6781 of 300 MPa or less.

* * * * *